United States Patent [19]

Grisar et al.

[11] 3,870,723

[45] Mar. 11, 1975

[54] 2-AZACYCLOALKYLMETHYL SUBSTITUTED BENZHYDRYL KETONES AND CARBINOLS

[75] Inventors: J. Martin Grisar; George P. Claxton, both of Cincinnati, Ohio

[73] Assignee: Richardson-Merrell Inc., New York, N.Y.

[22] Filed: Apr. 25, 1973

[21] Appl. No.: 354,315

[52] U.S. Cl...... 260/293.8, 260/239 B, 260/293.51, 260/293.73, 260/293.83, 260/293.84, 260/296 R, 260/296 D, 260/326.5 R, 260/326.5 S, 260/326.5 J, 260/326.9, 260/326.8, 260/465 R, 260/465 F, 260/465 G, 260/590, 424/244, 424/267, 424/274
[51] Int. Cl............................................. C07d 29/20
[58] Field of Search........ 260/239 B, 293.73, 293.8, 260/293.83, 293.84, 326.5 R, 326.5 S, 326.5 J

[56] References Cited
UNITED STATES PATENTS

| | | | |
|---|---|---|---|
| 3,316,272 | 4/1967 | Roberts et al. | 260/293.84 |
| 3,783,162 | 1/1974 | Grisar et al. | 260/239 B |

OTHER PUBLICATIONS

J. Med. Chem. 15:500–503 (May 1972), Claxton et al.

*Primary Examiner*—Henry R. Jiles
*Assistant Examiner*—S. D. Winters
*Attorney, Agent, or Firm*—William J. Stein; George W. Rauchfuss, Jr.; Eugene O. Retter

[57] ABSTRACT

Novel derivatives of 2-azacycloalkylmethyl substituted benzhydryl ketones and carbinols are described which are useful as anticoagulants.

5 Claims, No Drawings

2-AZACYCLOALKYLMETHYL SUBSTITUTED BENZHYDRYL KETONES AND CARBINOLS

FIELD OF THE INVENTION

This invention relates to novel 2-azacycloalkylmethyl substituted benzhydryl ketones and their carbinol derivatives, to a novel method of their preparation and to their use in preventing the coagulation of blood.

BACKGROUND OF THE INVENTION

This invention is related to copending application U.S. Ser. No. 354,206, filed concurrently herewith, which describes a general method for the preparation of 2-azacycloalkylmethyl ketones. The closest prior art known to applicants includes the preparation of 4'-(fluoren-9-ylidenemethyl)-2-(2-piperidyl)acetophenone, Claxton et al., J. Med. Chem. 15, 500 (1972), which is structurally unrelated to the instant compounds. To applicants' knowledge, the compounds described and claimed herein are compounds which have not previously been described nor reported in literature.

SUMMARY OF THE INVENTION

This invention relates to novel 2-azacycloalkylmethyl ketones and carbinols. More particularly, this invention relates to a class of substituted benzhydryl derivatives which are useful as anticoagulants and which may be represented by the general formula:

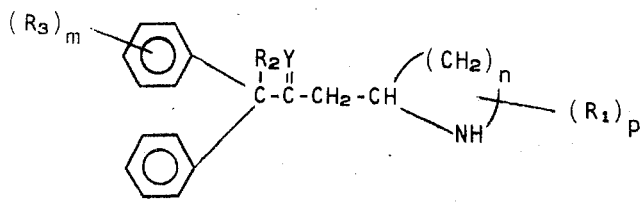

wherein $m$ is an integer of from 1 to 3; $n$ is an integer of from 3 to 5; $p$ is an integer of from 1 to 2; $R_1$ is selected from the group consisting of hydrogen or lower alkyl having from 1 to 4 carbon atoms; $R_2$ is selected from the group consisting of hydrogen and lower alkyl having from 1 to 4 carbon atoms; $R_3$ is selected from the group consisting of hydrogen, lower alkyl having from 1 to 4 carbon atoms, lower alkoxy having from 1 to 4 carbon atoms, lower alkylthio having from 1 to 4 carbon atoms and halogen; Y is the radical =O or

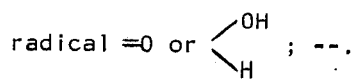

and the pharmaceutically acceptable acid addition salts thereof.

The compounds of the present invention are prepared by heating a solution of a 1-phenyl-1(substituted)phenyl-2-propanone or a 1-lower alkyl-1-phenyl-1(substituted) phenyl-2-propanone with magnesium methyl carbonate to form a magnesium chelate and condensing this chelate solution with a 1-azacycloalkene in an atmosphere of carbon dioxide. The 2-azacycloalkylmethyl substituted benzhydryl ketones so prepared are readily reduced to their corresponding alcohol by means of sodium borohydride.

A variety of compositions are also included within the scope of the present invention which are useful as anticoagulants.

DETAILED DESCRIPTION OF THE INVENTION

As seen by an examination of formula (1) above, the compounds of the present invention share in common a 2-azacycloalkylmethyl moiety and a benzhydryl or substituted benzhydryl moiety attached to the keto or carbinol function of the molecule. The various azacycloalkylmethyl moieties include the 5, 6 and 7-membered nitrogen-containing saturated heterocyclic rings as defined by the symbol n. Thus, when n is an integer of from 3 to 5 and $R^1$ is hydrogen, the corresponding heterocycles: 1-pyrrolidine, piperdine and 2,-3,4,5,6,7-hexahydro-1H-azapine are delineated. Such heterocycles may be further substituted as illustrated by the symbol $R_1$, which represents a lower alkyl group in additin to hydrogen. The term "lower alkyl" includes members having from 1 to 4 carbon atoms. Illustrative members of this group include the radicals methyl, ethyl, propyl, isopropyl, butyl, sec.-butyl and t-butyl. The 2-azacycloalkyl rings may be either mono or di-substituted as indicated by the symbol p. When di-substituted, the lower alkyl radicals may be substituted either upon the same carbon atom or upon different carbon atoms. Further substitution in the 2-position, however, is precluded as illustrated by the presence of a hydrogen atom in Formula (1) above. Thus, for example, 6-methyl-2,3,4,5-tetrahydropyridine and 2-phenyl-1-pyrroline were found not to undergo condensation.

The presence of a benzhydryl or substituted benzhydryl moiety is also shared in common as to all of the novel compounds described herein. This terminal portion of the molecule, which can also be regarded as a (substituted) diphenylmethyl radical, is also joined to the keto or carbinol function. The methyl group which bears both phenyl radicals may be further substituted with a lower alkyl radical as indicated by the symbol $R_2$ in formula (1) above. The expression lower alkyl as used with regard to the symbol $R_2$ includes the same members as previously enumerated for the symbol $R_1$.

The bennzhydryl moiety may be substituted or un-substituted as indicated by the symbol $R_3$. Additionally, the phenyl ring may be either mono, di or tri-substituted as indicated by the symbol $m$. When this ring is multisubstituted, i.e., the symbol $m$ is an integer of from 2 to 3, the phenyl radical can be indifferently substituted. That is to say, all of the substituents on the phenyl ring need not be the same. Substitution can occur at any one of the available positions of the phenyl ring as indicated by the non-specific attachment of the $R_3$ bond to the center of said ring. The symbol $R_3$ includes substituents which are in the nature of aliphatic radicals, aliphatic ethers and aliphatic thioethers. In each instance, the apliphatic substituent is a lower alkyl group having from 1 to 4 carbon atoms, represented by the same previously enumerated for thhe radical $R_1$. The phenyl radical may also be substituted with one, two or three halogen atoms. The term "halogen" refers only to the fluoro, chloro and bromo radicals.

The novel process described herein results in the preparation of 2-azacycloalkylmethyl substituted benz-hydryl ketones. Reduction of these ketones to the corresponding alcohols, which are also active anticoagulants, is readily achieved using methods well known to those skilled in the art. Suitable reducing agents include complex metal hydride reducing agents. Applicants have found sodium borohydride to be the reducing agent of choice in carrying out the reduction of these ketones. Two or more moles of sodium borohydride are generally used per mole of ketone reduced, the additional borohydride serving to neutralize the salts of the 2-azacycloalkylmethyl substituted benzhydryl ketones to their free base forms. The reaction is conducted in various organic solvents such as methanol, tetrahydrofuran or ethyl ether for period ranging from a few minutes to about 24 hours. In general, the reactants are mixed together at temperatures of 0°C. or below, whereupon the temperature is gradually allowed to increase to 30°C. Upon completion of the reaction, the reaction mixture is treated with water and the 2-azacycloalkylmethyl substituted vinylene carbinols are isolated and further purified by crystallization from an appropriate organic solvent.

The subclass of 2-piperidylmethyl substituted benzhydryl ketones are of particular interest inasmuch as they possess good anticoagulant activity and are readily prepared by condensation of the magnesium chelate with the trimer of 2,3,4,5-tetrahydropyridine. This class of compounds is delineated in formula (1) above, where the symbol $n$ is 4, $R_1$ is hydrogen, and Y is an oxo group.

Illustrative specific base compounds which are encompassed by formula (1) above, include:
1-phenyl-3-(2-piperidyl)-1-(p-tolyl)-2-propanone, 3,3-diphenyl-1-(2-pyrrolidinyl)-2-pentanone, 1,1-diphenyl-3-[2-(hexahydro-1H-azepinyl)]-2-propanone, 1-(4-fluorophenyl)-1-phenyl-3-(2-piperidyl)-2-propanone, 1-(4-methylthiophenyl)-1-phenyl-3-(5,5-dimethyl-2-pyrrolidinyl)-2-propanone, 1-(p-cumenyl)-1-phenyl-3-(4-tert.-butyl-2-piperidinyl)-2-propanone, 3,3-diphenyl-1-[2-(hexahydro-1H-azepinyl)]-2-butanone, 3-(2,4-dichlorophenyl)-3-phenyl-1-(2-piperidyl)-2-heptanone, 1,1-diphenyl-3-(5-methyl-2-pyrrolidinyl)-2-propanone, 3,3-diphenyl-1-(2-piperidyl)-2-butanone, α-(α-methyl-α-phenylbenzyl)-2-piperidineethanol, α-(α-ethyl-α-phenylbenzyl)-2-pyrrolidineethanol, 2-(2,5-dimethyl-α-phenylbenzyl)-2-piperidineethanol, and α-(diphenylmethyl)-2-(hexahydro-1H-azepine)ethanol.

The expression "pharmaceutically acceptable acid addition salts" refers to any non-toxic organic or inorganic acid addition salts of the base compounds represented by Formula (1). Illustrative inorganic acids which form suitable salts include hydrochloric, hydrobromic, sulfuric and phosphoric acids as well as acid metal salts such as sodium monohydrogen orthophosphate and potassium hydrogen sulfate. Illustrative organic acids which form suitable salts include the mono, di and tricarboxylic acids. Illustrative of such acids are, for example, acetic, propionic, glycolic, lactic, pyruvic, malonic, succinic, glutaric, fumaric, malic, tartaric, citric, ascorbic, maleic, hydroxymalic, benzoic, p-hydroxybenzoic, phenylacetic, cinnamic, salicylic, 2-phenoxybenzoic and sulfonic acids such as methanesulfonic acid and 2-hydroxyethanesulfonic acid. Either the mono or the di-acid salts can be formed, and such salts can be utilized in either a hydrated or a substantially anhydrous form.

In general the 2-azacycloalkylmethyl substituted benzhydryl ketones of the present invention are prepared by reacting a substituted benzhydryl methyl ketone with magnesium methyl carbonate (MMC) in solution to form a magnesium chelate. The resulting chelate is condensed in an atmosphere of carbon dioxide with a 1-azacycloalkene or a substituted 1-azacycloalkene at moderate or ambient temperatures. The 2-azacycloalkylmethyl substituted benzhydryl ketones which are formed are isolated as their acid addition salts or as their free base by precipitation or extraction from the reaction mixture. This reaction is schematically represented as follows:

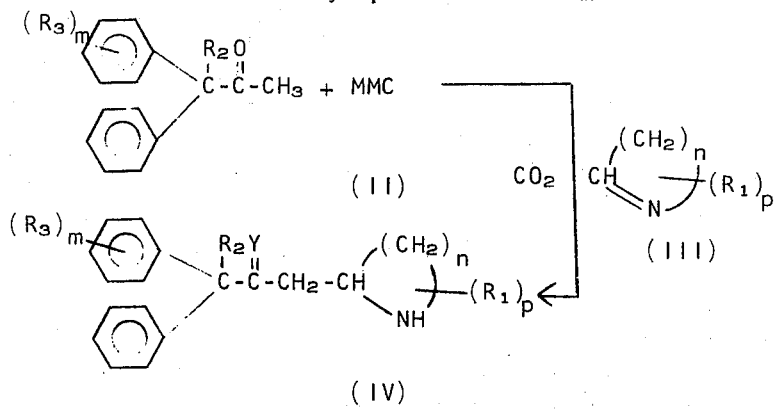

wherein $m$, $n$, $p$, $R_1$, $R_2$ and $R_3$ have the values previously assigned.

The MMC reagent is prepared by the addition of magnesium turnings to dry methanol until all of the metal is converted to magnesium methoxide. A solvent such as dimethylformamide is added and the stirred solution saturated with dry carbon dioxide as described by H. L. Finkbeiner and M. Stiles, J. Am. Chem. Soc., 85, 616 (1963). When a methyl ketone is permitted to react with a large excess of this reagent, a chelate results which is believed to have the formula:

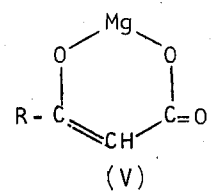

(V)

Generally, a 2 to 6 molar excess of the MMC reagent is employed at a temperature ranging from 80° to 120°C. Preferably an excess of 4 moles of MMC reagent is used for chelation at the higher temperatures. The methanol that is formed is removed by sweeping a stream of an inert gas, such as nitrogen, over the hot solution. After a period of time ranging from 2 to 36 hours the chelate solution is permitted to cool and the inert gas is replaced with carbon dioxide. The solution is saturated with carbon dioxide and a carbon dioxide atmosphere is maintained throughoutt the condensation of the chelate with the 1-azacycloalkene.

To the magnesium chelated methyl ketone solution is added a one molar equivalent or slight excess of 1-azacycloalkene with stirring. In general the condensation is effected by stirring the reaction mixture at ambient temperatures. The preferred reaction solvent is dimethylformamide since the MMC reagent is ordinarily prepared therein. On occasion it may be advantageous to add an additional inert solvent to the reaction mixture if, for example, the reaction is to be conducted at a temperature of less than −61°C., the freezing point of dimethylformamide. It is further practicable to precipitate the magnesium chelate by the addition of large amounts of ether and to dissolve or suspend the precipitated chelate in other inert solvents. Suitable solvents include tetrahydrofuran, benzene or dimethylacetamide.

Condensation takes place at temperatures ranging from −50° to 100°C. Preferably the reaction is conducted at temperatures ranging from 0° to 60°C. both as a matter of convenience and since elevation of the reaction temperature above 100°C. results in diminshed yields.

The reaction time varies from a few hours to several weeks depending upon the reaction temperature and the nature of the reactants, particularly with respect to the degree of steric hindrance of the substituted benzhydryl methyl ketone (II). Inasmuch as the reaction is conducted and remains a homogenous solution until completion, the duration of the reaction can readily be extended for several weeks. Preferably the reaction is conducted in a period of from 16 to 60 hours.

Of particular importance to the successful operation of this reaction is the maintenance of an appropriate atmosphere. Some success is obtained under normal atmospheric conditions, particularly in the presence of a small amount of moisture. Under anhydrous conditions in an atmosphere of nitrogen, however, no product is obtained. Consistently good yields result when the condensation is carried out in an atmosphere of carbon dioxide.

vents or solvent mixtures.

It is important to note that the 1-azacycloalkenes can exist as trimers, as for example, the trimers of 1-pyrroline and 2,3,4,5-tetrahydropyridine. In the case of the latter compound it can exist in two isomeric forms that are known as α and β-tripiperidein. In solution these trimers readily depolymerize to their monomers in a manner similar to the well known behavoir of formaldehyde. However, under alkaline aqueous conditions 2,3,4,5-tetrahydropyridine undergoes an irreversible self-condensation to form γ-tripiperidein. This self-condensation does not occur using the process of the present invention.

Illustrative 1-azacycloalkenes as indicated in Formula (III) above which are useful in the instant process include: 1-pyrroline, 3-methyl-1-pyrroline, 5,5-dimethyl-1-pyrroline, 3-propyl-2,3,4,5-tetrahydropyridine, 4-t.-butyl-2,3,4,5-tetrahydropyridine, 3,5-diethyl-2,3,4,5-tetrahydropyridine, 3,4,5,6-tetrahydro-2H-azepine, and 2,2-dimethyl-3,4,5,6-tetrahydro-2H-azepine.

The 1-phenyl-1-(substituted)phenyl-2-propanones employed herein as starting materials are prepared by a Friedel-Crafts alkylation with 3-bromo-3-phenylpropan-2-one, cf., R. C. Fuson et al., J. Amer. Chem. Soc. 67, 386 (1945).

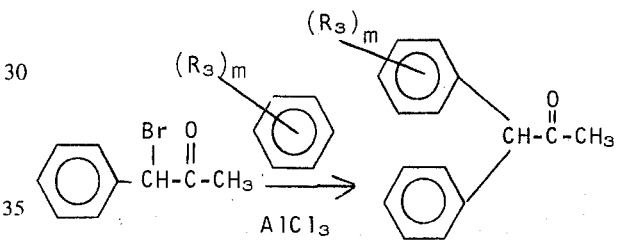

The 1-lower alkyl-1-phenyl-1-(substituted)phenyl-2-propanones are prepared by a Grignard reaction upon the corresponding nitriles

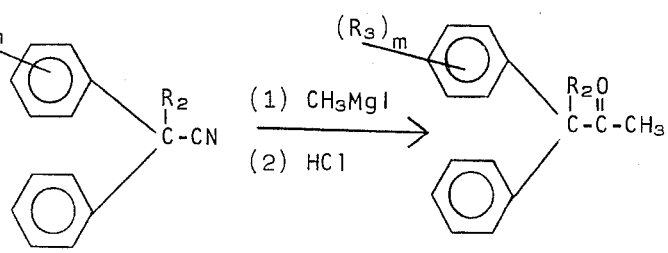

The desired products of this invention are isolated by pouring the reaction mixture into an excess of dilute acid. Preferably a mixture of 2 to 12 normal hydrochloric acid and ice is employed. When the acid addition salt of the desired 2-azacycloalkylmethyl ketone precipitates, it is collected by filtration. Alternatively, the acidified reaction mixture is extracted with a suitable solvent, as for example, chloroform or methylene chloride, and the solvent extract evaporated, leaving the desired product as a residue. It is also possible, but generally more cumbersome, to treat the acidified reaction mixture with a base such as sodium hydroxide until alkaline. The desired product can then be extracted using an appropriate solvent from the alkaline slurry containing precipitated magnesium hydroxide. In either event the crude products are readily purified by recrystallization of their acid addition salts using ordinary sol- The compounds of the present invention, including their acid addition salts and isomers, are useful as anticoagulants. They affect the coagulation of blood by preventing the aggregation of blood platelets. The blood platelets play a dominant role in thrombotic conditions, both in the initial event and at the occlusive stage. Arterial thrombosis, particularly in arteries supplying the heart muscle and brain, is a leading cause of death and disability. The compounds of the present invention can be administered to animals, mammals and humans, either per se or in combination with conventional pharmaceutical carriers in dosage unit forms. Suitable dosage unit forms include oral preparations such as tablets, capsules, powders, granules, oral solutions and suspensions, sublingual and intrabuccal preparations, as well as parenteral dosage unit forms which are useful for subcutaneous, intramuscular or intravenous administration. The quantity of active ingredient administered can vary over a wide range so as to provide from about 1.0 mg/kg to about 100 mg/kg of body weight per day in order to achieve the desired effect. Each unit dose can contain from about 5 to 500 mg of the active ingredient in combination with the pharmaceutical carrier. Such doses may be administered from 1 to 4 times daily.

In preparing solid compositions such as tablets, the principal active ingredient is mixed with conventional pharmaceutical excipients such as gelatin, starches, lactose, magnesium stearate, talc, acacia, dicalcium phosphate and functionally similar materials. Tablets can be laminated, coated or otherwise compounded to provide for a prolonged or delayed action and to release a predetermined successive amount of medication. Capsules are prepared by mixing the active ingredient with an inert pharmaceutical filler or diluent and filled in either hard gelatin capsules or machine encapsulated soft gelatin capsules. Syrups or elixirs can contain the active ingredients together with sucrose or other sweetening agents, methyl and propyl parabens as preservatives, and suitable coloring and flavoring agents.

Parenteral fluid dosage forms are prepared by utilizing the active ingredient in a sterile liquid vehicle, the preferred vehicle being water or a saline solution. Compositions having the desired clarity, stability and adaptability for parenteral use are obtained by dissolving from about 0.1 mg to about 3 grams of the active ingredient in a vehicle consisting of a mixture of nonvolatile liquid polyethylene glycols which are soluble in both water and organic liquids, and which have molecular weights ranging from about 200 to about 1500. Such solutions may advantageously contain suspending agents, such as sodium carboxymethylcellulose, methylcellulose, polyvinylpyrrolidone or polyvinyl alcohol. Additionally, they may contain bactericidal and fungicidal agents, as for example, parabens, benzyl alcohol, phenol or thimerosal. If desired, isotonic agents can be included, such as sugar or sodium chloride, as well as local anesthetics, stabilizing or buffering agents. In order to further enhance stability, the parenteral compositions may be frozen after filling and water removed by freeze-drying techniques well known in the art, enabling such dry, lyophilized powders to be reconstituted immediately prior to their use.

The following preparations and examples are illustrative of the novel compounds of the present invention and their compositions, but are not to be construed as necessarily limiting the scope thereof.

EXAMPLE I 2,3,4,5-Tetrahydropyridine Trimer

To 170 g (2.0 moles) of piperidine is added 120 g (2.0 moles) of acetic acid via dropwise addition at a temperature below 10°C. The resulting solution is added dropwise over a period of one hour to an aqueous solution containing 2.2 moles of Ca(ClO)$_2$ while maintaining the temperature of the reaction mixture at 0° to −5°C. Stirring is continued for an additional 15 minutes, and the mixture is extracted with ether. The ether extracts are combined, dried over anhydrous Na$_2$SO$_4$ and most of the solvent removed. (Caution! N-chloropiperidine tends to decompose spontaneously.) Approximately 200 ml of ether is permitted to remain and temperatures in excess of 60°C. are avoided. The remaining ether solution is added over a period of 2.5 hours in dropwise fashion to a vigorously stirred, refluxing solution containing 265 g (4.0 moles) of potassium hydroxide in 1250 ml of anhydrous ethyl alcohol. Stirring is continued for 2 hours and the mixture is allowed to remain at room temperature during which the 2,3,4,5-tetrahydropyridine trimerizes. The potassium chloride which precipitates is removed by filtration, washed with anhydrous ethanol, and the ethanol removed from the filtrate by distillation. The residue is dissolved in 750 ml of water, the potassium chloride previously collected is added, and the solution extracted with ether. The combined ether extracts are dried (MgSO$_4$) and the solvent removed by evaporation. Recrystallization of the residue from acetone yields 2,3,4,5-tetrahydropyridine as the α-trimer having a M.P. of 58°–61°C. The β-isomer (M.P. 40°–68°C.) can be converted to the more stable α-isomer by recrystallizaton from acetone containing 2% water. The material so prepared is stored in a closed container over potassium hydroxide and is stable for over 1 year.

EXAMPLE II

1-Pyrroline Trimer

To 140.3 g (1.05 moles) of N-chlorosuccinimide is added a solution of 71.1 g (1 mole) of pyrrolidine dissolved in 1 l of ethyl ether. The mixture is stirred at room temperature under N$_2$ for 24 hours and sufficient water added to dissolve the solids. The ether phase is separated, dried over anhydrous sodium sulfate and the solvent evaporated under nitrogen. (Caution! N-chloropyrrolidine tends to decompose spontaneously.) Approximately 100 ml of ether are permitted to remain and temperatures in excess of 60°C. are avoided. The remaining ether solution is added over a period of 1 ½ hours in dropwise fashion to a vigorously stirred, ice-cooled solution of 2 N methanolic potassium hydroxide. Stirring is continued for 1 hour and the methanol removed at a temperature of 25°–30°C. at a reduced pressure of approximately 200 mm. Water is added to the remaining residue and the resulting mixture is subjected to continuous extraction with ethyl ether. The ether extract is separated and distilled under nitrogen at atmospheric pressure. Fractions having a B.P. 81°–90°C. and 91°–97°C. are collected, the latter fraction warming spontaneously, presumably due to exothermic trimerization. Both fractions are capable of condensation with MMC chelates of methyl ketones.

EXAMPLE III

1-Phenyl-1-(p-xylyl)propanone

The following Example is illustrative of the preparation of 1-phenyl-1-(substituted)phenyl-2-propanones which are used as starting materials in the preparation of the compounds of the present invention.

To a solution of 67.1 g (0.5 mole) of phenyl-2-propanone in 1 l of anhydrous ethyl ether, which is cooled in the water bath, is added via dropwise addition 79.9 g (0.5 mole) of bromine over a period of 60 minutes. The reaction mixture is stirred for 1 hour, transferred to a separatory funnel and washed with three separate portions of water. The ethereal solution is dried over anhydrous sodium sulfate and the solvent removed by evaporation. The residue which consists of 106 g of 1-bromo-1-phenyl-2-propanone is dissolved in 150 ml of p-xylene and the solution is added to a suspension of 133 g (1 mole) of anhydrous aluminum chloride in 150 ml of p-xylene at 50°–60°C. via dropwise addition over a period of 90 minutes. The mixture is stirred for 30 minutes at 80°C., allowed to cool over a period of 2 hours, and poured into a mixture of 2 N hydrochloric acid and ice. The organic layer is separated, washed with 2 N hydrochloric acid, followed by a 2 N sodium carbonate solution wash, and the organic layer is dried over anhydrous sodium sulfate. The solution is distilled at 11 mm of pressure to remove the p-xylene and the residue is further distilled at 1 mm of pressure. The fraction boiling at 159°–63°C., 82.5 g (69% yield), shows an infrared absorption at 1720 $cm^{-1}$ and has a nuclear magnetic resonance spectrum consistent with the structure of 1-phenyl-1-(p-xylyl)propanone.

EXAMPLE IV 1,1-Diphenyl-3-(2-piperidyl)propan-2-one

Magnesium methyl carbonate (1.2 moles, 2 N in dimethylformamide) is heated to 120°C. under an atmosphere of carbon dioxide. The compound 1,1-diphenylacetone, 63.0 g (0.3 moles), is added and the mixture is stirred at 120°C. for a period of 4 hours under a stream of nitrogen to form the chelate, allowing the methyl alcohol that forms to escape. The mixture is cooled to room temperature under an atmosphere of carbon dioxide and 30.0 g (0.36 moles) of 2,3,4,5,-tetrahydropyridine (as α-tripiperidein) is added and stirring continued at room temperature for a period of 6 days under an atmosphere of carbon dioxide. The reaction mixture is poured into 375 ml of concentrated HCl on 400 g of ice and the resulting mixture is extracted with methylene dichloride. The extracts are combined, dried over anhydrous sodium sulfate and the solvent is removed. The crude oil is recrystallized twice from an aqueous isopropyl alcohol solution to yield 1,1-diphenyl-3-(2-piperidyl)propan-2-one as the hydrochloride salt having a M.P. of 197°–9°C. (dec.)

EXAMPLE V 3,3-Diphenyl-1-(2-piperidyl)-2-butanone

Following essentially the same procedure as described in the preceding Example, but substituting 3,3-diphenyl-2-butanone for the 1,1-diphenylacetone above, results in the preparation of 3,3-diphenyl-1-(2-piperidyl)-2-butanone as the hydrochloride salt, which when recrystallized from an aqueous isopropyl alcohol solution has a M.P. of 198°–200°C.

EXAMPLE VI

1-Phenyl-3-(2-piperidyl)-1-(p-xylyl)-2-propanone

Following essentially the same procedure as described in Example IV, but substituting 1-phenyl-1-(p-xylyl)-2-propanone for the 1,1-diphenylacetone, results in the preparation of 1-phenyl-3-(2-piperidyl)-1-(p-xylyl)-2-propanone as the hydrochloride salt, which when recrystallized from an aqueous isopropyl alcohol solution has a M.P. of 190°–2°C.

EXAMPLE VII 1-(2,4,6-Trimethylphenyl)-1-phenyl-3-(2-piperidyl)-2-propanone

Following essentially the same procedure as described in Example IV, but substituting 1-(2,4,6-trimethylphenyl)-1-phenyl-2-propanone for the 1,1-diphenylacetone above, results in the preparation of 1-(2,4,6-trimethylphenyl)-1-phenyl-3-(2-piperidyl)-2-propanone as the hydrochloride salt, which when recrystallized from an aqueous isopropanol solution, has a M.P. of 242°–4°C. (dec.)

EXAMPLE VIII 3,3-Diphenyl-1-(2-piperidyl)-2-hexanone

Following essentially the same procedure as described in Example IV, but substituting 3,3-diphenyl-2-hexanone for the 1,1-diphenylacetone above, results in the preparation of 3,3-diphenyl-1-(2-piperidyl)-2-hexanone as the hydrochloride salt, which when recrystallized from an aqueous isopropyl alcohol solution, has a M.P. of 174°–6°C.

EXAMPLE IX 1-(4-Chlorophenyl)-1-phenyl-3-(2-piperidyl)-2-propanone

Following essentially the same procedure as described in Example IV, but substituting 1-(4-chlorophenyl)-1-phenyl-2-propanone for the 1,1-diphenylacetone above, results in the preparation of 1-(4-chlorophenyl)-1-phenyl-3-(2-piperidyl)-2-propanone as the hydrochloride salt, which when recrystallized from an aqueous isopropanol solution has a M.P. of 191°–3°C.

EXAMPLE X

α-(Diphenylmethyl)-2-piperidineethanol glycolate

To a suspension of 4.4 g (0.116 mole) of sodium borohydride in 250 ml of absolute ethanol is added with stirring 12.7 g (0.0386 mole) of 1,1-diphenyl-3-(2-piperidyl)propan-2-one hydrochloride. The mixture is stirred at room temperature overnight and poured into 1 l of water. The desired product is extracted into ether, and the combined ether extracts are treated with 3 portions of a 10% aqueous acetic acid solution. The acetic acid washes are combined, make alkaline with a 2 N sodium hydroxide solution and the desired product is re-extracted into ether. The glycolate salt is prepared by the addition of glycolic acid and recrystallized from isopropyl alcohol which contains a small amount of water. The product so obtained is a mixture of diastereoisomers which melts at 155°–87°C. (dec.) Infrared, ultraviolet and nuclear magnetic resonance spectra all conform with the structure of α-(diphenylmethyl)-2-piperidineethanol glycolate.

Following essentially the same procedure but substituting for the 1,1-diphenyl-3-(2-piperidyl)propan-2-one hydrochloride above, the following ketone hydrochlorides: 1-(2,4,6-trimethylphenyl)-1-phenyl-3-(2-piperidyl)-2-propanone, 3,3-diphenyl-1-(2-piperidyl)-2-hexanone and 1-(4-chlorophenyl)-1-phenyl-3-(2-piperidyl)-2-propanone results in the formation of the following carbinols as the glycolate salts, respectively: α-(2,4,6-trimethyl-α-phenylbenzyl)-2-piperidineethanol having a M.P. of 215°–9°C. (dec.), α-(α-phenyl-α-propylbenzyl)-2-piperidineethanol having a M.P. of 172°–3°C. (dec.) and α-(4-chloro-α-phenylbenzyl)-2-piperidineethanol, the latter product having been obtained as two pairs of diastereoisomers, one pair having a M.P. of 176°–80°C. (dec.) and the other pair being crystallized as a hemihydrate salt having a M.P. of 149°–52°C. (dec.).

EXAMPLE XI

The anticoagulant activity of the compounds of this invention is determined by the inhibition of platelet (white thrombus) aggregation, which is the initial phase involved in the coagulation of blood. Platelet-rich plasma (PRP) obtained from a human volunteer, having a platelet count of approximately 400,000/mm$^3$ is aggregated using approximately 2 micrograms of adenosine diphosphate per ml of PRP. Quantitative platelet aggregation measurements are made using a photometer connected to an automatic recorder which measures the changes in optical clarity of standard cell containing the test solution. As the platelets aggregate, light transmission increases and thus both the rate of aggregation and the degree of aggregation can be determined. In this fashion, adenosine diphosphate induced aggregation of platelet-rich plasma is compared under identical circumstances to a corresponding aliquot containing a dilute solution of the test compound.

Following this procedure the compound 1-phenyl-3-(2-piperidyl)-1-(p-xylyl)-2-propanone hydrochloride at a concentration of 100 and 30 micrograms/milliliter demonstrates an in vitro inhibition of adenosine diphosphate induced platelet aggregation in human platelet-rich plasma of 91% and 28%, respectively.

EXAMPLE XII

Preparation of a tablet formulation

One thousand tablets for oral use, each containing 25 mg of 1-phenyl-3-(2-piperidyl)-1-(p-xylyl)-2-propanone hydrochloride are prepared according to the following formulation:

| | | Grams |
|---|---|---|
| (a) | 1-phenyl-3-(2-piperidyl)-1-(p-xylyl)-2-propanone hydrochloride | 25 |
| (b) | Dicalcium phosphate | 150 |
| (c) | Methylcellulose, U.S.P. (15 cps) | 6.5 |
| (d) | Talc | 20 |
| (e) | Calcium stearate | 2.5 |

The 1-phenyl-3-(2-piperidyl)-1-(p-xylyl)-2-propanone hydrochloride and dicalcium phosphate are mixed well, granulated with a 7.5% aqueous solution of methylcellulose, passed through a No. 8 screen and carefully dried. The dried granules are passed through a No. 12 screen, blended with talc and calcium stearate and compressed into tablets.

EXAMPLE XIII

Preparation of a capsule formulation

One thousand two-piece hard gelatin capsules for oral use each containing 100 mg of 1-phenyl-3-(2-piperidyl)-1-(p-xylyl)-2-propanone hydrochloride are prepared from the following ingredients:

| | | Grams |
|---|---|---|
| (a) | 1-phenyl-3-(2-piperidyl)-1-(p-xylyl)-2-propanone hydrochloride | 100 |
| (b) | Lactose, U.S.P. | 100 |
| (c) | Starch, U.S.P. | 10 |
| (d) | Talc, U.S.P. | 5 |
| (e) | Calcium stearate | 1 |

The finely powdered materials are mixed until uniformly dispersed and filled into hard shelled gelatin capsules of the appropriate size.

In a similar fashion one-piece soft gelatin capsules can be prepared in which the above formulation can be granulated, slugged or compressed directly into a rotary die or plate mold in which the capsule is formed. Alternatively, the above excipients may be omitted and the active ingredient dispensed as a powder directly into the capsule.

EXAMPLE XIV

Preparation of a parenteral solution

A sterile aqueous suspension suitable for parenteral use is prepared from the following ingredients:

| | | Grams |
|---|---|---|
| (a) | 1-phenyl-3-(2-piperidyl)-1-(p-xylyl)-2-propanone hydrochloride | 1 |
| (b) | Polyethylene glycol 4000, U.S.P. | 3 |
| (c) | Sodium chloride | 0.9 |
| (d) | Polyoxyethylene derivatives of sorbitan monooleate (TWEEN 80) U.S.P. | 0.4 |
| (e) | Sodium metabisulfite | 0.1 |
| (f) | Methylparaben, U.S.P. | 0.18 |
| (g) | Propylparaben, U.S.P. | 0.02 |
| (h) | Water for injection q.s. to 100 ml | |

The parabens, sodium metabisulfite, and sodium chloride are dissolved in approximately one-half the volume of water for injection at 80°C. with stirring. The solution is cooled to below 40°C. and the active ingredient is dissolved therein followed by the polyethylene glycol 4,000 and the polyoxyethylene derivatives of sorbitan monooleate. The cooled solution is adjusted to the final volume with water for injection and is then sterilized by sterile filtration through a suitable filter. Each one ml of solution contains 10 mg of 1-phenyl-3-(2-piperidyl)-1-(p-xylyl)-2-propanone hydrochloride as the active ingredient.

We claim:

1. A 2-azacycloaklylmethyl substituted benzhydryl ketone and carbinol having the formula:

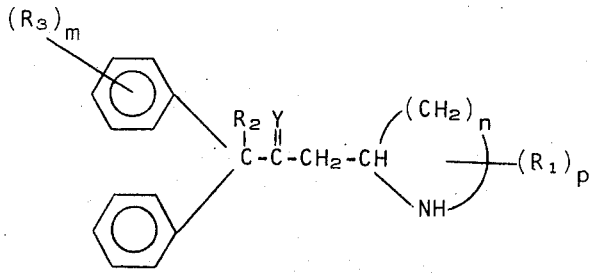

wherein $m$ is an integer of from 1 to 3; $n$ is an integer of from 3 to 5; $p$ is an integer of from 1 to 2; $R_1$ is selected from the group consisting of hydrogen or lower alkyl having from 1 to 4 carbon atoms; $R_2$ is selected from the group consisting of hydrogen and lower alkyl having from 1 to 4 carbon atoms; $R_3$ is selected from the group consisting of hydrogen, lower alkyl having from 1 to 4 carbon atoms, lower alkoxy having from 1 to 4 carbon atoms, lower alkylthio having from 1 to 4 carbon atoms and halogen; Y is the radical =O or

or a pharmaceutically acceptable acid addition salt thereof.

2. A compound of claim 1 wherein $n$ is 4; $R_1$ is hydrogen; and Y is the radical =O.

3. A compound of claim 1 which is 1-phenyl-3-(2-piperidyl)-1-(p-xylyl)-2-propanone or a pharmaceutically acceptable acid addition salt thereof.

4. A compound of claim 1 which is 3,3-diphenyl-1-(2-piperidyl)-2-butanone or a pharmaceutically acceptable acid addition salt thereof.

5. A compound of claim 1 which is α-(α-phenyl-α-propylbenzyl)-2-piperidineethanol or a pharmaceutically acceptable acid addition salt thereof.

* * * * *